(No Model.)
C. A. MACDONALD.
FLEXIBLE CONNECTION FOR PISTON AND PITMAN RODS.
No. 443,860. Patented Dec. 30, 1890.
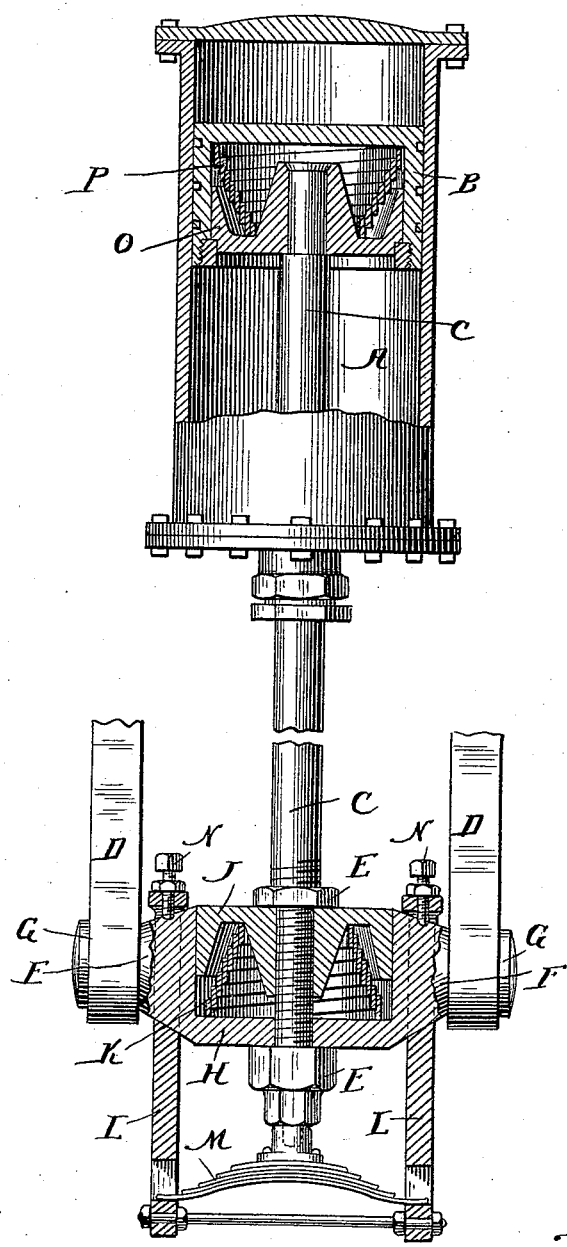
Witnesses
Celeste P. Chapman.
Davida J. Johnson
Inventor
Charles A. MacDonald.
By Francis W. Parker
Attorney.

UNITED STATES PATENT OFFICE.

CHARLES A. MacDONALD, OF CHICAGO, ILLINOIS, ASSIGNOR TO THE HERCULES IRON WORKS, OF SAME PLACE.

FLEXIBLE CONNECTION FOR PISTON AND PITMAN RODS.

SPECIFICATION forming part of Letters Patent No. 443,860, dated December 30, 1890.

Application filed March 14, 1890. Renewed December 6, 1890. Serial No. 373,746. (No model.)

*To all whom it may concern:*

Be it known that I, CHARLES A. MACDONALD, a subject of the Queen of Great Britain, and a resident of Chicago, in the county of Cook and State of Illinois, have invented a new and useful Improvement in Flexible Connections for Piston and Pitman Rods, of which the following is a full, clear, and exact specification.

My invention relates to the connection between pitmen and pistons, and has for its object to provide a flexible connection whereby to relieve unusual strain on the piston.

My invention is illustrated in the accompanying drawing, wherein the figure shows a side and part sectional view of a cylinder with piston and piston-rod therein, and the connections between the piston and pitman.

A is the cylinder; B, the piston; C, the piston-rod.

D D are the links leading from the pitman to the cross-head, to which the piston-rod is connected. The piston-rod is provided with the screw-nuts E E, oppositely faced and on opposite sides of the cross-head proper. This cross-head is provided with the projections F F, on which the links are journaled, the collars G G to retain such links in position, and the chambered body H, through an aperture in the lower part of which the screw-threaded portion of the piston-rod C freely passes.

J is a sort of channeled piston screw-threaded upon and rigid with the piston-rod C, and adapted to slightly reciprocate within the cavity in the body H of the cross-head. Within this cavity, and resting within the channeled portion of the piston J, is the heavy spring K.

L L are links encircling the body H, and supporting each at its lower extremity one end of the spring M and carrying at its upper end the screw-bolt N, which terminates in a point pivoted upon the top of the body H. The spring M receives the end of the piston-rod. Within the cavity in the piston B is a sort of chambered piston O, secured to the piston-rod, and a spring P.

The use and operation of my invention are as follows: In all ordinary operations the connection between the piston and the pitman by means of the cross-head and the links is to such a degree rigid and firm that the action of the piston B is unyielding. It has been found, however, in practice with certain kinds of cylinders and for certain classes of work that solid matter sometimes creeps into the cylinder and accumulates in the end thereof to such a degree that when the stroke of the piston is unyielding the cylinder itself or some of the working parts may be shattered and broken. The elastic or yielding connection which I have devised is designed to obviate this difficulty, and not only so but to enable the operator to see when such condition exists. If, now, in the operation the piston B reaches the end of its effective stroke and there be some resistance in the cylinder, it will be apparent that the springs K and M and P, or whichever one of them be used, in the event of either of them being dispensed with, will yield sufficient to prevent injury to the parts, and that not only will the connections so yield, but this yielding will at once become apparent to the operator, who can easily distinguish the motion of the parts, and he will be able to take whatever precautions or steps may be necessary in the premises. I have shown the three springs, and either may be so adjusted as to become sufficient, though all may be used together. I prefer, however, in practice a spring supported and constructed as is spring M. The tension of spring M is adjusted by means of the screws N N, and the tension of spring K by means of the nuts E E. The lower nut E limits the length of the stroke, and can of course be varied at will, while the upper nut E, as shown in the drawings, acts against the spring K, and the end of the piston-rod C against the spring M, as the case may be, to relieve against the obstruction in the cylinder in the path of the piston.

If the spring P is omitted, of course the piston B could then have the usual solid form and a piston-rod be connected with it. If the spring K is dispensed with, the cross-head could be made solid. In that event the nut E or the corresponding part should be moved back, or the shoulder on the upper portion of the piston-rod C should be at some distance from the top of the cross-head to give the parts play.

I claim as new and desire to secure by Letters Patent—

1. The combination of a piston-rod and pitman and a cross-head containing two springs compressible between such cross-head and rod to relieve extraordinary strains on the rod.

2. The combination of a piston-rod and pitman and a cross-head, links upon said cross-head, and a spring suspended thereby and bearing against the end of such piston-rod to relieve extraordinary strains on such rod.

Signed at Chicago this 12th day of February, 1890.

CHARLES A. MacDONALD.

In presence of—
    CELESTE P. CHAPMAN,
    DAVIDA J. JOHNSON.